(12) United States Patent
Mir

(10) Patent No.: US 7,538,514 B2
(45) Date of Patent: May 26, 2009

(54) SYSTEMS AND METHODS FOR CONTROLLING TORQUE OF A MOTOR

(75) Inventor: Sayeed A. Mir, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 105 days.

(21) Appl. No.: 11/740,061

(22) Filed: Apr. 25, 2007

(65) Prior Publication Data

US 2008/0265830 A1 Oct. 30, 2008

(51) Int. Cl.
*H02P 23/00* (2006.01)

(52) U.S. Cl. .................. 318/799; 318/432; 318/437; 318/599; 180/65.1; 180/65.3

(58) Field of Classification Search .............. 318/489, 318/432, 437, 442, 560, 599, 799; 180/65.1, 180/65.3, 443, 446
See application file for complete search history.

(56) References Cited

U.S. PATENT DOCUMENTS

| 6,026,926 | A  | * | 2/2000  | Noro et al. ............... 180/446 |
| 6,427,105 | B1 | * | 7/2002  | Matsushita ............... 701/41 |
| 6,549,871 | B1 |   | 4/2003  | Mir et al. |
| 7,034,499 | B2 | * | 4/2006  | Kerlin et al. ............. 318/749 |
| 7,119,530 | B2 |   | 10/2006 | Mir et al. |
| 7,202,622 | B2 | * | 4/2007  | Eskritt et al. ........... 318/400.24 |
| 2006/0158142 | A1 | * | 7/2006 | Kurosawa et al. ........... 318/254 |
| 2007/0107973 | A1 | * | 5/2007 | Jiang et al. ............... 180/443 |

* cited by examiner

*Primary Examiner*—Bentsu Ro
*Assistant Examiner*—Thai Dinh
(74) *Attorney, Agent, or Firm*—Thomas N. Twomey

(57) ABSTRACT

A system and a method for controlling torque of a motor are provided. The method includes modifying a phase advance angle based on an identified phase coil that has a faulted condition, a type of fault condition, and a polarity of a commanded torque to obtain a desired output torque from a motor.

8 Claims, 10 Drawing Sheets

SYSTEMS AND METHODS FOR CONTROLLING TORQUE OF A MOTOR

TECHNICAL FIELD

This application relates to systems and methods for controlling torque of a motor.

BACKGROUND

Electric power steering systems for vehicles have utilized permanent magnet brushless DC motors to assist an operator in steering the vehicle. However, if phase coils of a motor become undesirably shorted together, the motor acts as a generator device and a braking torque is applied to a shaft of the motor. During this condition, vehicle operator must overcome the braking torque of the motor while turning a vehicle steering wheel in order to steer the vehicle.

Accordingly, the inventors herein have recognized a need for a system and method for controlling a torque of a motor that minimizes and/or eliminates the above-mentioned drawback.

SUMMARY OF THE INVENTION

A method for controlling torque of a motor in accordance with an exemplary embodiment is provided. The motor has first, second, and third phase coils. The method includes determining a motor position value indicative of a position of the motor. The method further includes determining a first phase advance angle associated with the first phase coil. The method further includes determining when a shorted operational condition occurs at an input node of the first phase coil. The method further includes when both the short operational condition is occurring and the motor position value indicates the motor is within a predetermined angular range, then determining a second phase advance angle associated with the first phase coil based on a calibration value. The method further includes determining first, second, and third phase voltage amplitude values based on the second phase advance angle. The method further includes determining first, second, and third duty cycle values based on the first, second, and third phase voltage amplitude values, respectively. The method further includes determining a modified first duty cycle value based on the first duty cycle value and a first predetermined value. The modified first duty cycle value is indicative of a voltage that would be present at the input node of the first phase coil during the shorted operational condition. The method further includes determining a modified second duty cycle value based on the second duty cycle value and a second predetermined value. The method further includes determining a modified third duty cycle value based on the third duty cycle value and a third predetermined value. The method further includes applying first, second, and third voltages having first, second, and third duty cycles, respectively, based on the modified first, second, and third duty cycle values, respectively, to the first, second, and third phase coils, respectively, to obtain a desired torque from the motor.

A system for controlling torque of a motor, the motor having first, second, and third phase coils in accordance with another exemplary embodiment is provided. The system includes a controller configured to determine a motor position value indicative of a position of the motor. The controller is further configured to determine a first phase advance angle associated with the first phase coil. The controller is further configured to determine when a shorted operational condition occurs at an input node of the first phase coil. The controller is further configured to determine a second phase advance angle associated with the first phase coil based on a calibration value when both the short operational condition is occurring and the motor position value indicates the motor is within a predetermined angular range. The controller is further configured to determine first, second, and third phase voltage amplitude values based on the second phase advance angle, the controller further configured to determine first, second, and third duty cycle values based on the first, second, and third phase voltage amplitude values, respectively. The controller is further configured to determine a modified first duty cycle value based on the first duty cycle value and a first predetermined value. The modified first duty cycle value is indicative of a voltage that would be present at the input node of the first phase coil during the shorted operational condition. The controller is further configured to determine a modified second duty cycle value based on the second duty cycle value and a second predetermined value. The controller is further configured to determine a modified third duty cycle value based on the third duty cycle value and a third predetermined value. The system further includes a motor control circuit operably coupled to the first, second, and third phase coils of the motor and to the controller. The controller is further configured to induce the motor control circuit to apply first, second, and third voltages having first, second, and third duty cycles, respectively, based on the modified first, second, and third duty cycle values, respectively, to the first, second, and third phase coils, respectively, to obtain a desired torque from the motor.

A method for controlling torque of a motor in accordance with another exemplary embodiment is provided. The motor has first, second, and third phase coils. The method includes determining first, second, and third duty cycle values associated with the first, second, and third phase coils, respectively. The method further includes determining when a shorted operational condition occurs at an input node of the first phase coil. The method further includes determining a modified first duty cycle value based on the first duty cycle value and a first predetermined value. The modified first duty cycle value is indicative of a voltage that would be present at the input node of the first phase coil during the shorted operational condition. The method further includes determining a modified second duty cycle value based on the second duty cycle value and a second predetermined value. The method further includes determining a modified third duty cycle value based on the third duty cycle value and a third predetermined value. The method further includes applying first, second, and third voltages having first, second, and third duty cycles, respectively, based on the modified first, second, and third duty cycle values, respectively, to the first, second, and third phase coils, respectively, to obtain a desired torque from the motor.

A system for controlling torque of a motor in accordance with another exemplary embodiment is provided. The motor has first, second, and third phase coils. The system includes a controller configured to determine first, second, and third duty cycle values associated with the first, second, and third phase coils, respectively. The controller is further configured to determine when a shorted operational condition occurs at an input node of the first phase coil. The controller is further configured to determine a modified first duty cycle value based on the first duty cycle value and a first predetermined value. The modified first duty cycle value is indicative of a voltage that would be present at the input node of the first phase coil during the shorted operational condition. The controller is further configured to determine a modified second duty cycle value based on the second duty cycle value and a second predetermined value. The controller is further configured to determine a modified third duty cycle value based on the third duty cycle value and a third predetermined value. The system further includes a motor control circuit operably coupled to the first, second, and third phase coils of the motor and to the controller. The controller is further configured to induce the motor control circuit to apply first, second, and third voltages having first, second, and third duty cycles, respectively, based on the modified first, second, and third duty cycle values, respectively, to the first, second, and third phase coils, respectively, to obtain a desired torque from the motor.

DESCRIPTION OF EXEMPLARY EMBODIMENTS

Figure 1:
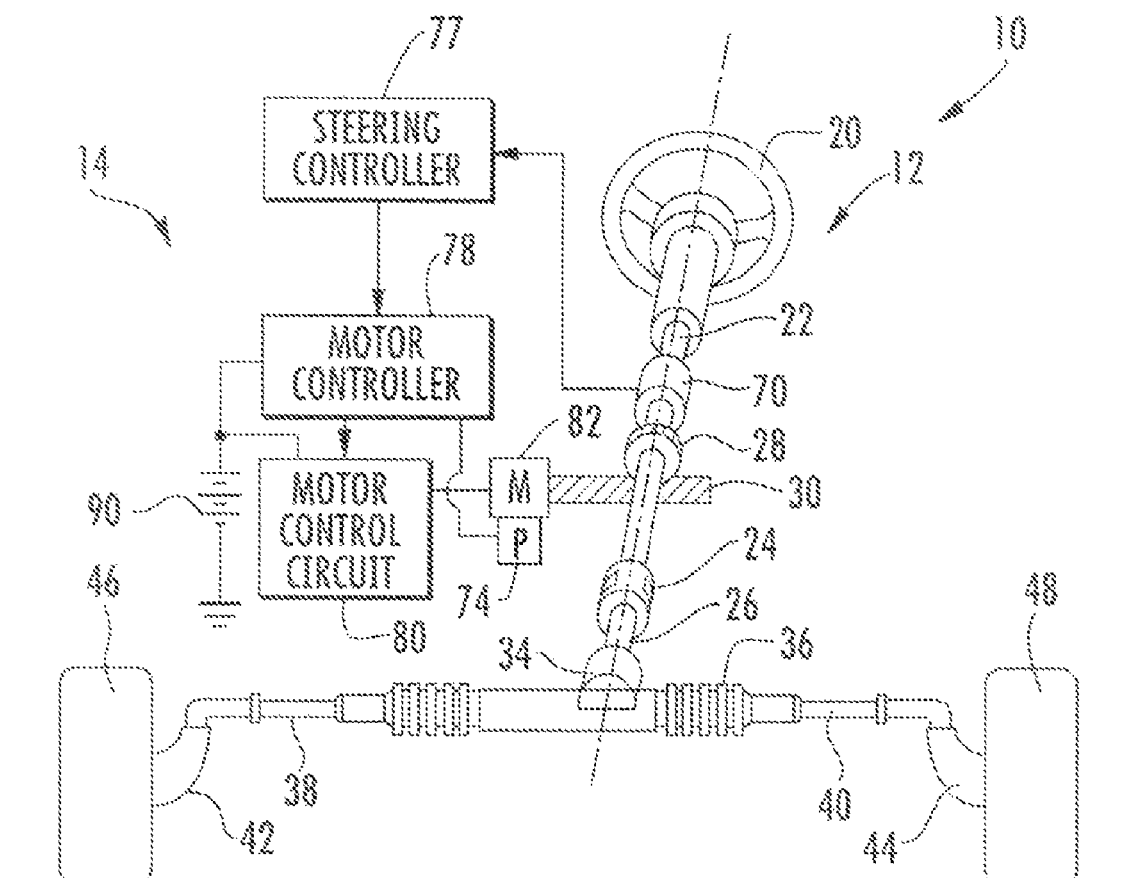
FIG. 1 is a schematic of a vehicle having a steering system, and a control system for controlling a torque of a motor in accordance with an exemplary embodiment.
Figure 2:
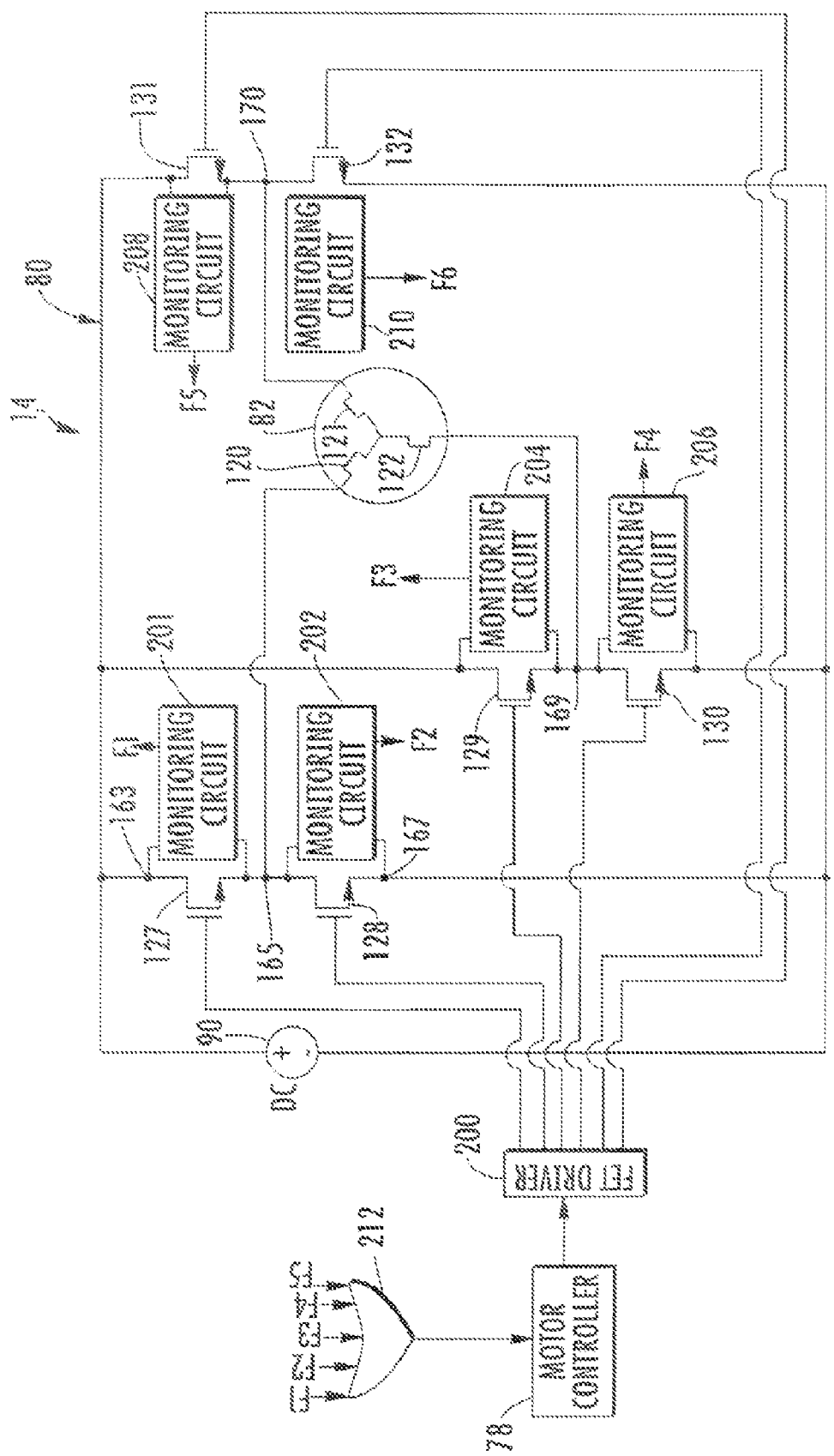
FIG. 2 is an electrical schematic of the control system of FIG. 1.

Referring to FIGS. 1 and 2, a vehicle 10 having a steering system 12 and a motor control system 14 is illustrated. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like.

The steering system 12 is provided to steer the vehicle 10 in a desired direction. The steering system includes a handwheel 20, an upper steering shaft 22, a universal joint 24, a lower steering shaft 26, a worm gear 28, a worm 30, a gear housing 34, a rack and pinion steering mechanism 36, tie rods 38, 40, steering knuckles 42, 44, and roadway wheels 46, 48. In one exemplary embodiment, the steering system 12 is an electric power steering system that utilizes the rack and pinion steering mechanism 36. The steering mechanism 36 includes a toothed rack (not shown) and a pinion gear (not shown) located under the gear housing 34. During operation, as the handwheel 20 is turned by a vehicle operator, the upper steering shaft 22 connected to the lower steering shaft 26 turns the pinion gear. Rotation of the pinion gear moves the toothed rack which moves the tie rods 39, 40 which in turn moves the steering knuckles 42, 44, respectively, and the roadway wheels 46, 48, respectively.

The motor control system 14 is provided to control operation of the motor 82 in order to assist a vehicle operator in steering the vehicle 10. The control system 14 includes a handwheel torque sensor 70, a position sensor 74, a steering controller 77, a motor controller 78, and a motor control circuit 80.

The handwheel torque sensor 70 is provided to generate a signal indicative of an amount of torque being applied to the vehicle handwheel 20 by a vehicle operator. In one exemplary embodiment, the handwheel torque sensor 70 includes a torsion bar (not shown) which outputs a signal to the controller 78 based on an amount of twist of the torsion bar.

The position sensor 74 is provided to generate a signal indicative of a position of a rotor of the motor 82. As shown, the position sensor 74 operably communicates with the motor controller 78.

The steering controller 77 is provided to generate a commanded torque value for the motor 82 based on the signal from the handwheel torque sensor 70. The steering controller 77 sends the commanded torque value to the motor controller 78.

The motor controller 78 is provided to generate control signals for controlling operation of the FET driver 200 and the motor control circuit 80, for controlling a torque output by the motor 82. The motor controller 78 is also provided to determine when one or more of the transistors 127, 128, 129, 130, 131, 132 have a shorted operational condition based on signals from the monitoring circuits 202, 201, 206, 204, 210, 208, respectively which are logically ORed in the logical OR gate 212. The output signal from the gate 212 is received by the motor controller 78. The operation of the motor controller 78 will be explained in greater detail hereinafter.

Referring to FIG. 2, the motor control circuit 80 is provided to generate commutation pulses for controlling operation of a three-phase brushless electrical motor 82. The motor 82 includes phase coils 120, 121, and 122 having a Y-configuration, and a rotor (not shown). The motor control circuit 80 includes switches 127, 128, 129, 130, 131 and 132, FET driver 200, monitoring circuits 201, 202, 204, 206, 208, 210 and the logical OR gate 212. It should be noted that in an alternative embodiment, the motor 8d could have less than three phase coils or more than three phase coils.

The transistors 127, 128, 129, 130, 131 and 132 are provided to selectively couple the battery 90 with phase coils 120, 121, 122 to energize and de-energize the coils. The transistors 127, 128, 129, 130, 131 and 132 may take any of a plurality of forms well-known in the art. For example, the transistors may comprise MOSFETs. As shown, the transistors 127, 128 are connected in series between positive and negative terminals of battery 90. A node 165 between transistors 127, 128 is electrically coupled to the phase coil 120. The transistors 131, 132 are connected in series between positive and negative terminals of the battery 90. A node 170 between switches 131, 132 is electrically coupled to the phase coil 121. The transistors 129, 130 are connected in series between positive and negative terminals of the battery 90. A node 169 between transistors 129, 130 is electrically coupled to the phase coil 122.

The FET driver 200 is provided to control the operational states of the transistors 127, 128, 129, 130, 131 and 132, in response to control signals received from the motor controller 78. As shown, the FET driver 200 is electrically coupled to gates of the transistors 127, 128, 129, 130, 131 and 132.

Figure 3:
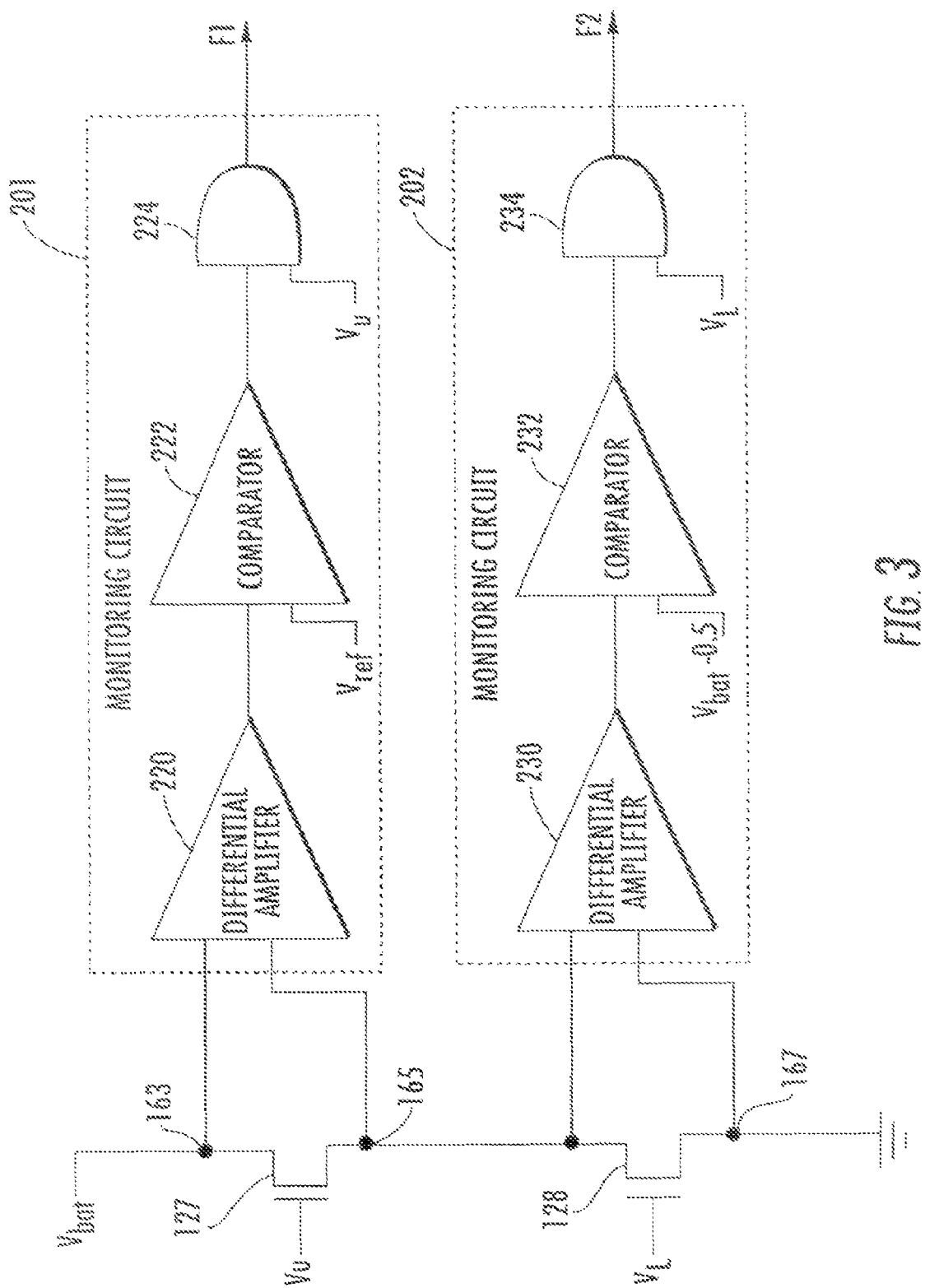
FIG. 3 is a schematic of an electrical short sensing circuit utilized in the control system of FIG. 1.

The monitoring circuits 201, 202, 204, 206, 208, 210 are provided to detect shorted operational conditions of the transistors 128, 127, 130, 129, 132, 131, respectively. Referring to FIG. 3, the monitoring circuit 201 will now be explained in greater detail. It should be noted that the monitoring circuits 204, 208 have a substantially similar configuration as the monitoring circuit 201. Accordingly, only a detailed description of the monitoring circuit 201 will be provided herein.

The monitoring circuit 201 is provided to detect a shorted operational condition of the transistor 128. The monitoring circuit 201 includes a differential amplifier 220, a comparator 222 and a logical AND gate 224. The differential amplifier 220 has first and second input terminals electrically coupled to nodes 163, 165, respectively. An output terminal of the differential amplifier 220 is electrically coupled to a first input terminal of the comparator 222. A second input terminal of the comparator 222 receives a reference voltage ($V_{ref}$). An output terminal of the comparator 222 is electrically coupled to a first input terminal of the logical AND gate 224. A second input terminal of the logical AND gate 224 receives a voltage ($V_U$) that is also received by the gate terminal of the transistor 127. An output terminal of the logical AND gate 224 is electrically coupled to the logical OR gate 212.

During operation of the monitoring circuit 201, when the transistor 128 has a shorted operational condition, a voltage output by the differential amplifier 220 is equal to ($V_{bat}$) which is the voltage output by the voltage supply 90. Further, the comparator 222 outputs a logical "1" value because the ($V_{bat}$) voltage applied to the first input terminal of the comparator 222 is greater than the voltage ($V_{ref}$) applied to the second input terminal of the comparator 222. Still further, the logical AND gate 224 outputs a logical "1" value indicating a shorted operational condition of the transistor 128 when both the first terminal of the logical AND gate 224 has a logical "1" value and the second input terminal of the gate 224 receives the voltage ($V_U$) representing a logical "1" value.

The monitoring circuit 202 will now be explained in greater detail. It should be noted that the monitoring circuits 206, 210 have a substantially similar configuration as monitoring circuit 202. The monitoring circuit 202 is provided to detect a shorted operational condition of the transistor 127. The monitoring circuit 202 includes a differential amplifier 230, a comparator 232 and a logical AND gate 234. The differential amplifier 230 has first and second input terminals electrically coupled to nodes 165, 167, respectively. An output terminal of the differential amplifier 230 is electrically coupled to a first input terminal of the comparator 232. A second input terminal of the comparator 232 receives a reference voltage ($V_{bat}$–0.5). An output terminal of the comparator 232 is electrically coupled to a first input terminal of the logical AND gate 234. A second input terminal of the logical AND gate 234 receives a voltage ($V_L$) that is also received by the gate terminal of the transistor 128. An output terminal of the logical AND gate 234 is electrically coupled to the logical OR gate 212.

During operation of the monitoring circuit 202, when the transistor 127 has a shorted operational condition, a voltage output by the differential amplifier 230 is equal to ($\frac{1}{2}V_{bat}$). Further, the comparator 232 outputs a logical "1" value because the ($\frac{1}{2}V_{bat}$) voltage applied to the first input terminal of the comparator 232 is greater than the voltage ($V_{bat}$–0.5) applied to the second input terminal of the comparator 232. Still further, the logical AND gate 234 outputs a logical "1" value indicating a shorted operational condition of the transistor 127 when both the first terminal of the logical AND gate 234 has a logical "1" value and the second input terminal of the gate 234 receives the voltage ($V_L$) representing a logical "1" value.

A brief description of a problem associated with other motor control systems will now be explained. In a shorted phase coil condition, if the motor controller is operated without taking corrective steps, a shorted condition could exist across a battery which could result in an undesired torque be produced by a motor. If the power to the motor is disconnected by opening a relay at the input battery voltage terminal this could result into undesired braking torque depending upon the size of the motor. In the present exemplary embodiments disclosed herein, the problems associated with the other systems is solved by a method for operating a motor to provide the steering assist even under the shorted phase coil condition.

Figure 4:
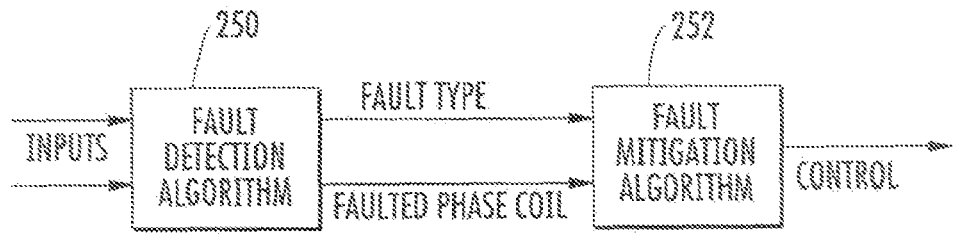
FIG. 4 is a block diagram of computer algorithms utilized by the control system of FIG. 2.
Figure 5:
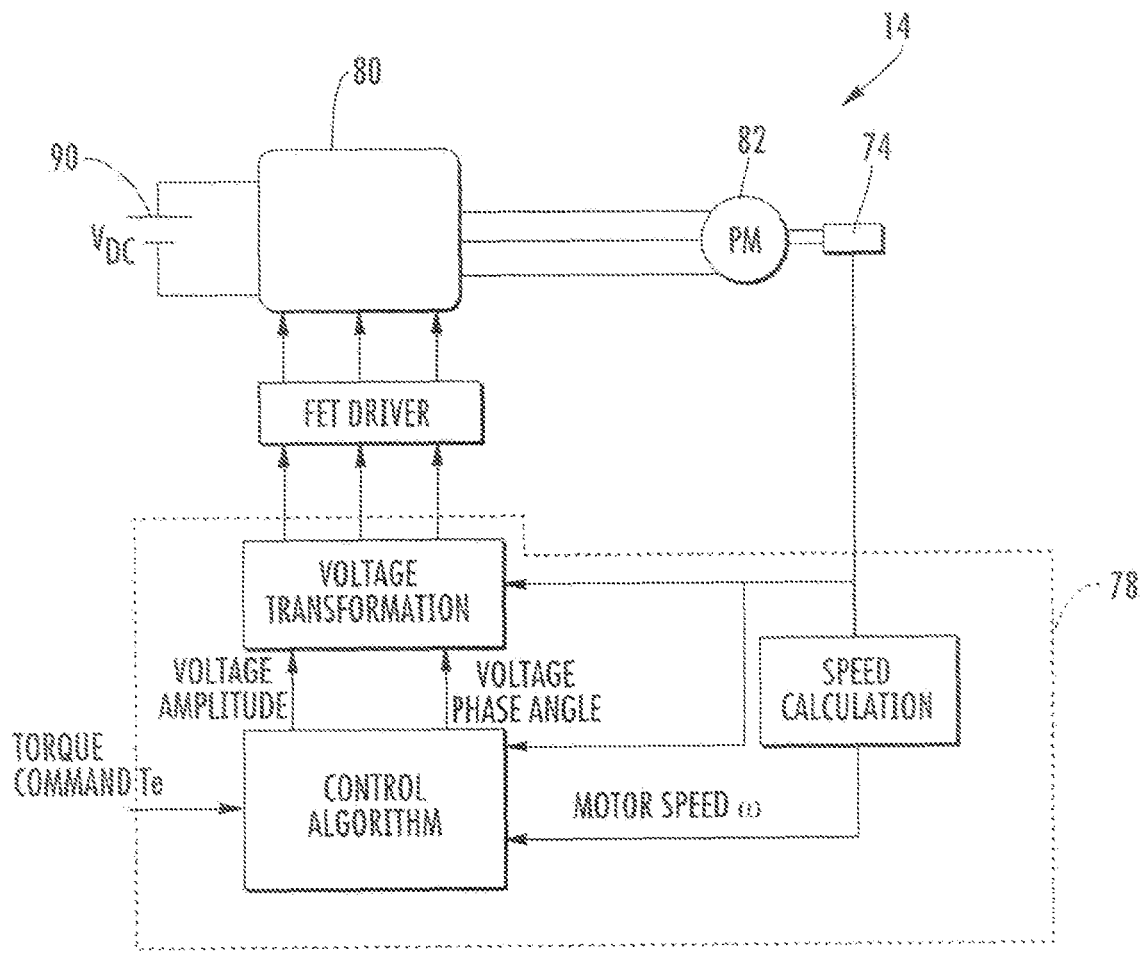
FIG. 5 is a simplified block diagram of the control circuit of FIG. 2.

Referring to FIG. 4, a block diagram of fault detection algorithm 250 and a fault mitigation algorithm 252 utilized by the motor controller 78 is illustrated. When a fault condition of a phase coil is detected by the fault detection algorithm 250, the fault detection algorithm 250 sends a faulted phase identifier indicating a specific phase coil and a fault type identifier to a fault mitigation algorithm 252. The fault mitigation algorithm 252 takes the appropriate action based upon the faulted phase identifier and the fault type identifier.

Referring to FIG. 4, a simplified block diagram of the motor control system 14 is illustrated. A general overview of the operation of motor control system 14 will now be provided. During operation, a phase voltage amplitude and phase advance angle are calculated based upon a desired motor torque and a motor speed. The phase advance angle is defined as an electrical angle between reference phase coil (e.g., phase coil 120) back emf and a voltage vector). A sinusoidal instantaneous line voltage is determined based on a calculated phase voltage amplitude, the phase advance angle, and a motor position and is applied across the phase coils. An instantaneous line voltage value is obtained by applying a pulse width modulated (PWM) voltage across the phase coils. The average value of the PWM voltage is equal to the desired instantaneous voltage applied at that position of the motor. The average voltage applied across each phase coil is calculated from the voltage amplitude and electrical angle according to the following equations:

$$Va = V\sin(\theta+\delta)$$

$$Vb = V\sin(\theta-120+\delta)$$

$$Vc = V\sin(\theta+120+\delta)$$

where a, b and c represent the three phase coils of the motor, q is the instant motor position, V is the voltage amplitude, and q is the phase voltage angle (angle between back emf and the voltage vector). It should be noted that there are different methods of profiling the phase coil voltages in order to achieve a sinusoidal line-to-line voltage in a three phase coil Y-connected AC motor. One method is to apply sinusoidal voltages at the phase coil terminal. Another method is to apply a non-sinusoidal voltage across the phase coil terminals that results in a sinusoidal line-to-line voltage. In this method, the phase coil terminal voltage reference of all three phase coils is shifted by a known value.

When a fault condition occurs, a motor phase coil is shorted to one of the battery terminals, which means that the shorted phase voltage is either battery voltage or ground. In this event, the motor control system 14 shifts a phase coil terminal voltage reference so that a voltage applied at the shorted (faulted) phase coil terminal is equal to a voltage that would be obtained on the faulted phase coil terminal under a shorted condition. Further, the FETs are switched so that the average voltage across the three phase coils is equal to modified voltages. It should be noted that although the foregoing steps will provide a driver assist torque during a fault condition, there are also certain motor positions where a phase coil terminal voltage is clamped to a maximum value or a minimum value and thus a desired voltage cannot be applied to the motor to obtain a desired torque response. The motor control system 14, however, can modify a voltage phase angle so that an applied voltage to a phase coil at these certain motor positions is such that after changing the reference voltage, the amplitude of the phase coil voltage is within the clamped voltage range.

Referring to FIGS. 8-12, a flowchart of a method for controlling a torque of a motor in accordance with another exemplary embodiment will now be explained. In particular, the method will modify phase advance angles associated with the phase coils of the motor 82, when one of the phase coils has a shorted operational condition to obtain a desired output torque. For purposes discussion, it will be presumed that the transistor 128 has a shorted operational condition.

At step 330, the monitoring circuit 201 detects a shorted operational condition of the lower transistor 128 in the motor control circuit 80 operably coupled to an input node of the phase coil 120 of the motor 82, and sends a signal indicating the shorted operational condition to the motor controller 78.

At step 332, the motor controller 78 determines a motor position value (Theta) indicative of a position of the motor 82, based on a signal from the motor position sensor 74.

At step 333, the motor controller 78 determines a first voltage phase angle based on a torque and a speed of the motor 82.

It should be noted that motor position where a voltage reaches a clamped maximum or minimum value is dependent on (i) which phase coil is shorted, (ii) the type of fault condition (a short to battery or a short to ground), and (iii) a polarity of a commanded torque. Therefore, the first voltage phase angle is modified based on the identified phase coil that is shorted, the type of fault condition, and the polarity of the commanded torque. In the current example, phase coil 120 is used as the reference phase coil and all angles are defined with reference to the phase coil 120. It is assumed that the phase coil 121 is shifted by 120 electrical degrees from phase coil 120 and phase coil 122 is shifted by 240 electrical degrees from phase coil 120.

At step 334, the motor controller 78 determines a first phase advance angle (P_shift) associated with the phase coil 120 utilizing the following equation: P_shift=120*(phase coil number−1) degrees, wherein the phase coil number equals "1" for the phase coil 120, "2" for the phase coil 121, and "3" for the phase coil 122 of the motor 82. The motor controller 78 shifts the first voltage phase angle utilizing the first phase advance angle (P_shift).

As discussed above, the motor position at which the first voltage phase angle is modified is dependent on the type of fault condition. For example, the motor position at which the first voltage phase angle is modified is shifted by 180 degrees if the motor phase is shorted to the positive terminal of the battery 90.

At step 336, the motor controller 78 makes a determination as to whether an upper transistor 127 (electrically connected between the positive terminal of battery 90 and a phase coil) has a shorted operational condition. If the value of step 336 equals "yes", the method advances to step 338. Otherwise, the method advances to step 340.

At step 338, the motor controller 78 sets an angle offset value (Off_set) equal to 180 degrees. After step 338, the method advances to step 342.

At step 340, the motor controller 78 sets the angle offset value (Off_set) equal to 0 degrees. After step 340, the method advances to step 342.

As discussed above, the motor position at which the first voltage phase angle is modified is dependent on the polarity of the commanded torque.

At step 342, the motor controller 78 makes a determination as to whether a commanded torque value (Te_com) is positive or negative. If the value of the commanded torque value (Te_com) is greater than 0. If the value of step 342 equals "yes", the method advances to step 344. Otherwise, the method advances to step 352.

At step 344, the motor controller 78 makes a determination as to whether the motor position (Theta) is within a predetermined range defined by (Off_set+P_shift+Cal_1) to (Off_set+P_shift+Cal_2) where Cal_1 and Cal_2 are predetermined calibration values. If the value of 344 equals "yes", the method advances to step 346. Otherwise, the method advances to step 348.

At step 346, the motor controller 78 determines a second phase advance angle (Delta) associated with the phase coil 120 utilizing the following equation: Delta=Delta+Cal_3, wherein Cal_3 is a predetermined calibration value. After step 346, the method advances to step 370.

At step 348, the motor controller 78 makes a determination as to whether the motor position (Theta) is within a predetermined range defined by (Off_set+P_shift+Cal_4) to (Off_set+P_shift+Cal_5). If the value of step 348 equals "yes", the method advances to step 350. Otherwise, the method advances to step 370.

At step 350, the motor controller 78 determines the second phase advance angle (Delta) associated with the phase coil 120 utilizing the following equation: Delta=Delta+Cal_6, wherein Cal_6 is a predetermined calibration value. After step 350, the method advances to step 370.

Referring again to step 342, if the value of step 342 equals "no" indicating that a commanded torque value is less than or equal to zero, the method advances to step 352.

At step 352, the motor controller 78 makes a determination as to whether the motor position (Theta−180) is within a predetermined range defined by (Off_set+P_shift+Cal_1) to (Off_set+P_shift+Cal_2). If the value of step 352 equals "yes", the method advances to step 354. Otherwise, the method advances to step 356.

At step 354, the motor controller 78 determines the second phase advance angle (Delta) associated with the phase coil 120 utilizing the following equation: Delta=Delta+Cal_3, wherein Cal_3 is a calibration value. After step 354, the method advances to step 370.

At step 356, the motor controller 78 makes a determination as to whether the motor position (Theta) is within a predetermined range defined by (Off_set+P_shift+Cal_4) to (Off_set+P_shift+Cal_5), wherein Cal_4 and Cal_5 are predetermined calibration values. If the value of step 356 equals "yes", the method advances to step 358. Otherwise, the method advances to step 370.

At step 358, the motor controller 78 determines the second phase advance angle (Delta) associated with the phase coil 120 utilizing the following equation: Delta=Delta+Cal_6, wherein Cal_6 is a predetermined calibration value. After step 358, the method advances to step 370.

At step 370, the motor controller 78 determines first, second, and third phase voltage amplitude values (Va, Vb, Vc) based on the second phase advance angle (Delta), utilizing the following equations:

$$Va = V^* \sin(Theta + Delta)$$

$$Vb = V^* \sin(Theta + Delta - 120)$$

$$Vc = V^* \sin(Theta + Delta + 120).$$

At step 372, the motor controller 78 determines first, second, and third duty cycle values (Da, Db, Dc) based on the first, second, and third phase voltage amplitude values (Va, Vb, Vc), respectively.

At step 374, the motor controller 78 makes a determination as to whether an upper transistor 127 has a shorted operational condition. If the value of step 374 equals "yes", the method advances to step 376. Otherwise, the method advances to step 378.

At step 376, the motor controller 78 sets a voltage change value (V_ch) equal to "1." After step 376, the method advances to step 380.

At step 378, the motor controller 78 sets a voltage change value (V_ch) equal to "0." After step 378, the method advances to step 380.

At step 380, the motor controller 78 makes determination as to whether a transistor coupled to phase coil 120 has a shorted operational condition. If the value of step 380 equals "yes", the method advances to step 382. Otherwise, the method advances to step 384.

At step 382, the motor controller 78 sets the duty cycle correction value (D_cor) equal to (Da). After step 382, the method advances to step 392.

At step 384, the motor controller 78 makes a determination as to whether a transistor coupled to the phase coil 121 has a shorted operational condition. If the value of step 384 equals "yes", the method advances to step 336. Otherwise, the method advances to step 388.

At step 386, the motor controller 78 sets the duty cycle correction value (D_cor) equal to (Db). After step 386, the method advances to step 388.

At step 388, the motor controller 78 makes a determination as to whether a transistor coupled to the phase coil 122 has a shorted operational condition. If the value of step 380 equals "yes", the method advances to step 390. Otherwise, the method advances to step 392.

At step 390, the motor controller 78 sets the duty cycle correction value (D_cor) equal to (Dc). After step 390, the method advances to step 392.

At step 392, the motor controller 78 determines modified first, second, and third duty cycle values (Da_mod, Db_mod, Dc_mod), utilizing the following equations:

$$Da\_mod = Da + V\_ch - D\_cor$$

$$Db\_mod = Db + V\_ch - D\_cor$$

$$Dc\_mod = Dc + V\_ch - D\_cor.$$

At step 394, the motor controller 78 clamps the modified first, second, and third duty cycle values (Da_mod, Db_mod, Dc_mod) such that the first, second, and third duty cycle values (Da_mod, Db_mod, Dc_mod) cannot be greater than "1" or less than "0." After step 394, the method advances to step 396.

At step 396, the motor controller 78 makes a determination as to whether the motor position (Theta) is within a predetermined range defined by the following expressions: (Theta>angle1+Off_set+P_shift) and (Theta<angle2+Off_set+P_shift). If the value of step 396 equals "yes", the method advances to step 398. Otherwise, the method advances to step 400.

At step 398, the motor controller 78 sets the modified first, second, and third duty cycle values (Da_mod, Db_mod, Dc_mod) equal to zero to disable the transistors coupled to the phase coils 120, 121, 122 of the motor 82. After step 398, the method advances to step 400.

At step 400, the motor controller induces the transistor driver 200 to apply first, second, and third voltages having first, second, and third duty cycles, respectively, based on the modified first, second, and third duty cycle values (Da_mod, (Db_mod, Dc_mod), respectively, to the phase coils 120, 121, 122, respectively, to obtain a desired torque from the motor 82. After step 400, the method is exited.

Figure 6:
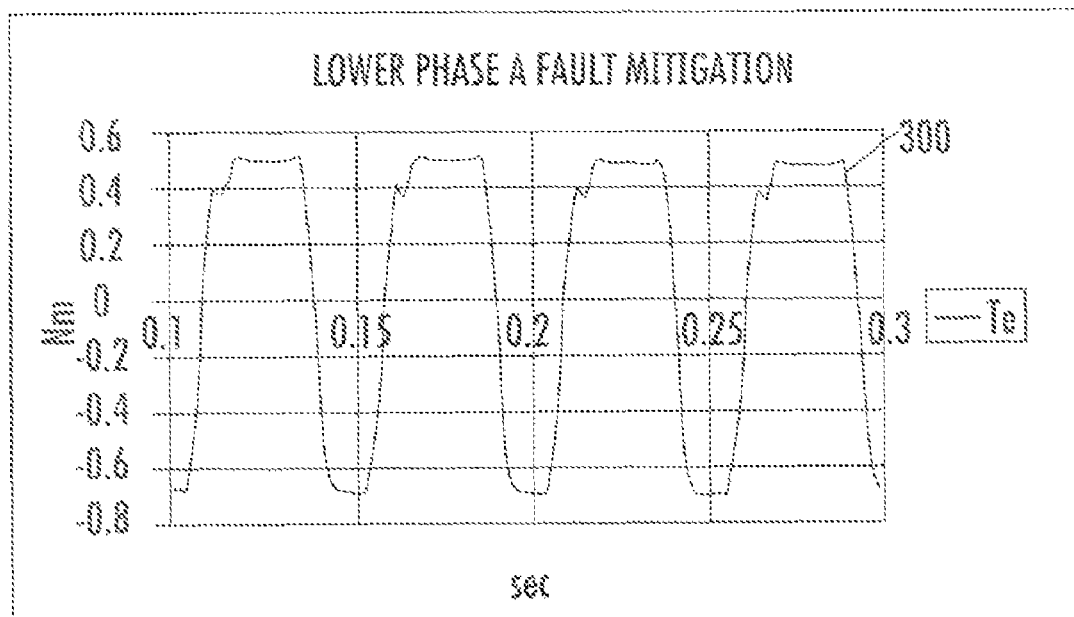
FIG. 6 is a signal schematic of an exemplary voltage applied to a phase coil of the motor of FIG. 1.
Figure 7:
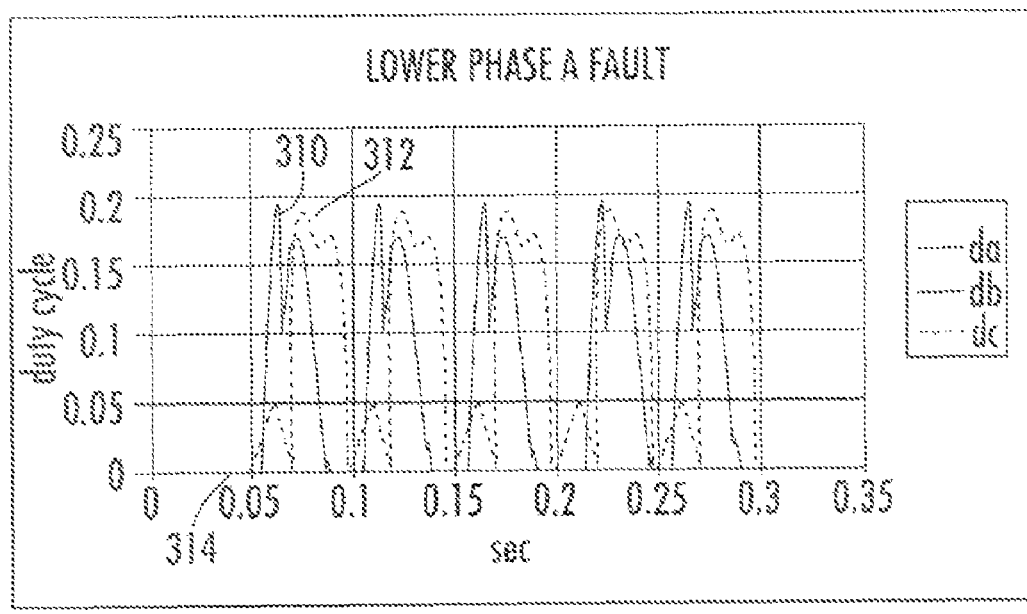
FIG. 7 are signal schematics illustrating duty cycles of signals applied to first, second, and third phase coils of the motor of FIG. 1.
Figure 8:
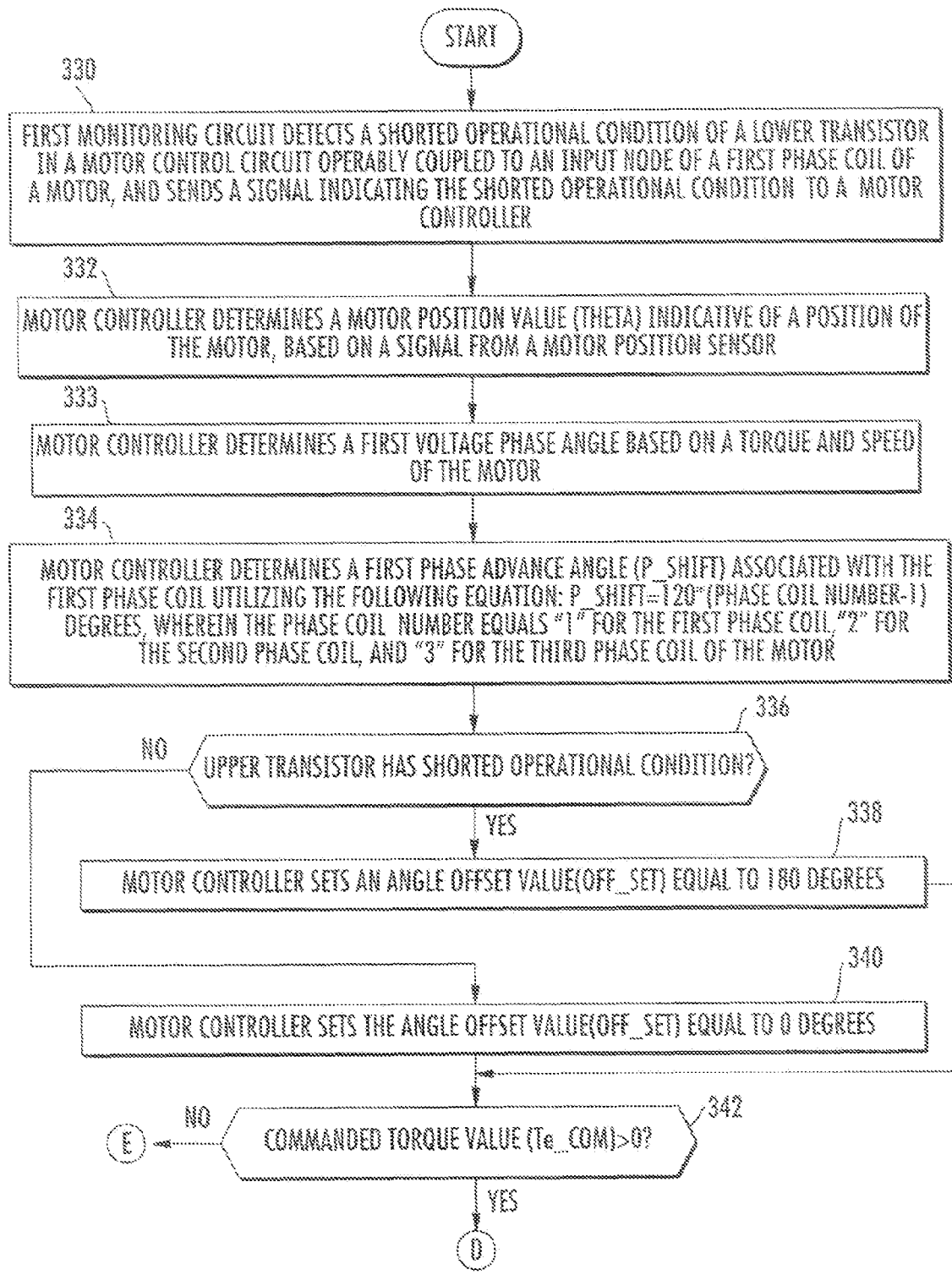
FIGS. 8-12 are flowcharts of a method for controlling a torque of the motor in accordance with another exemplary embodiment.
Figure 9:
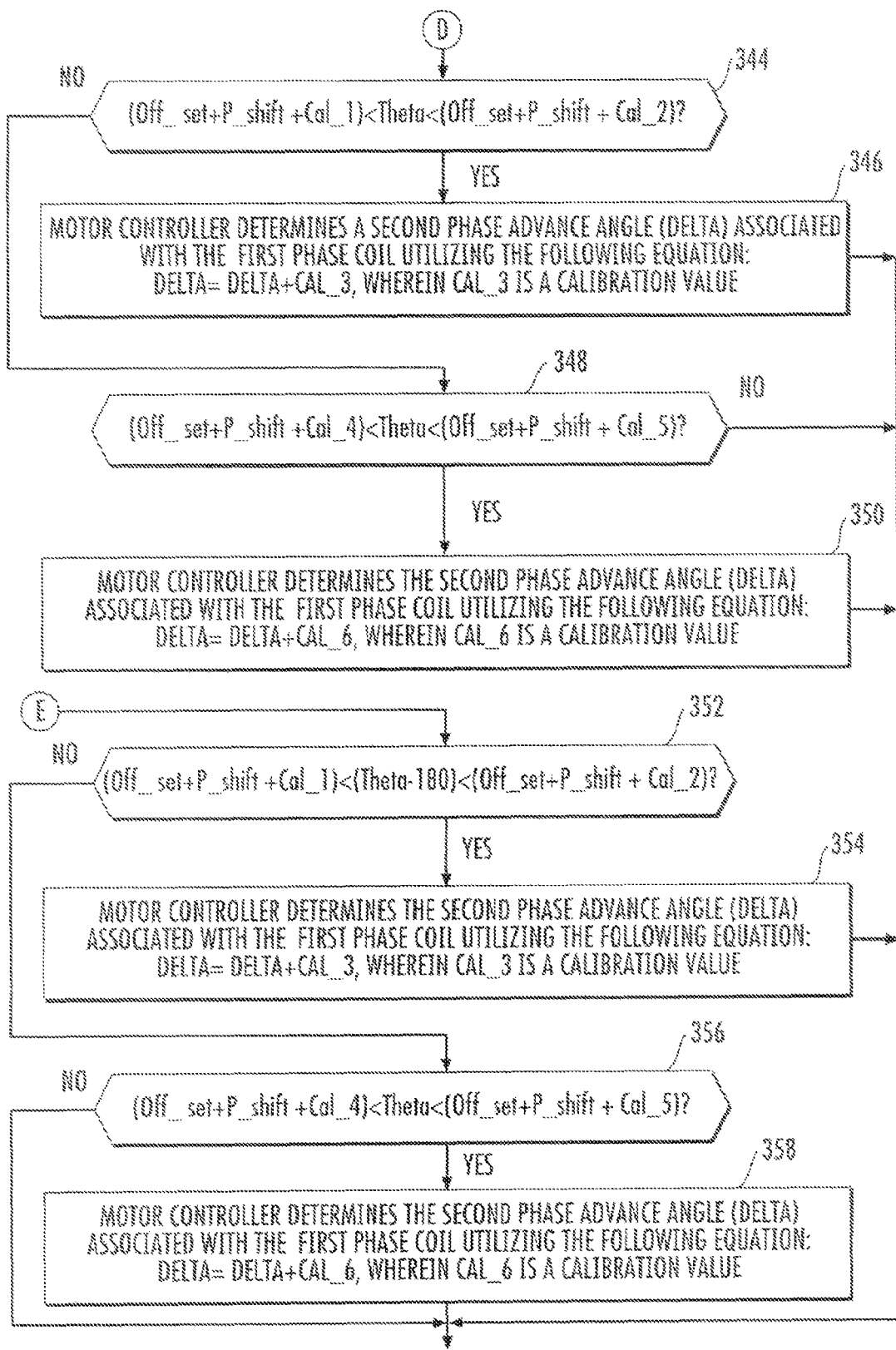
Figure 10:
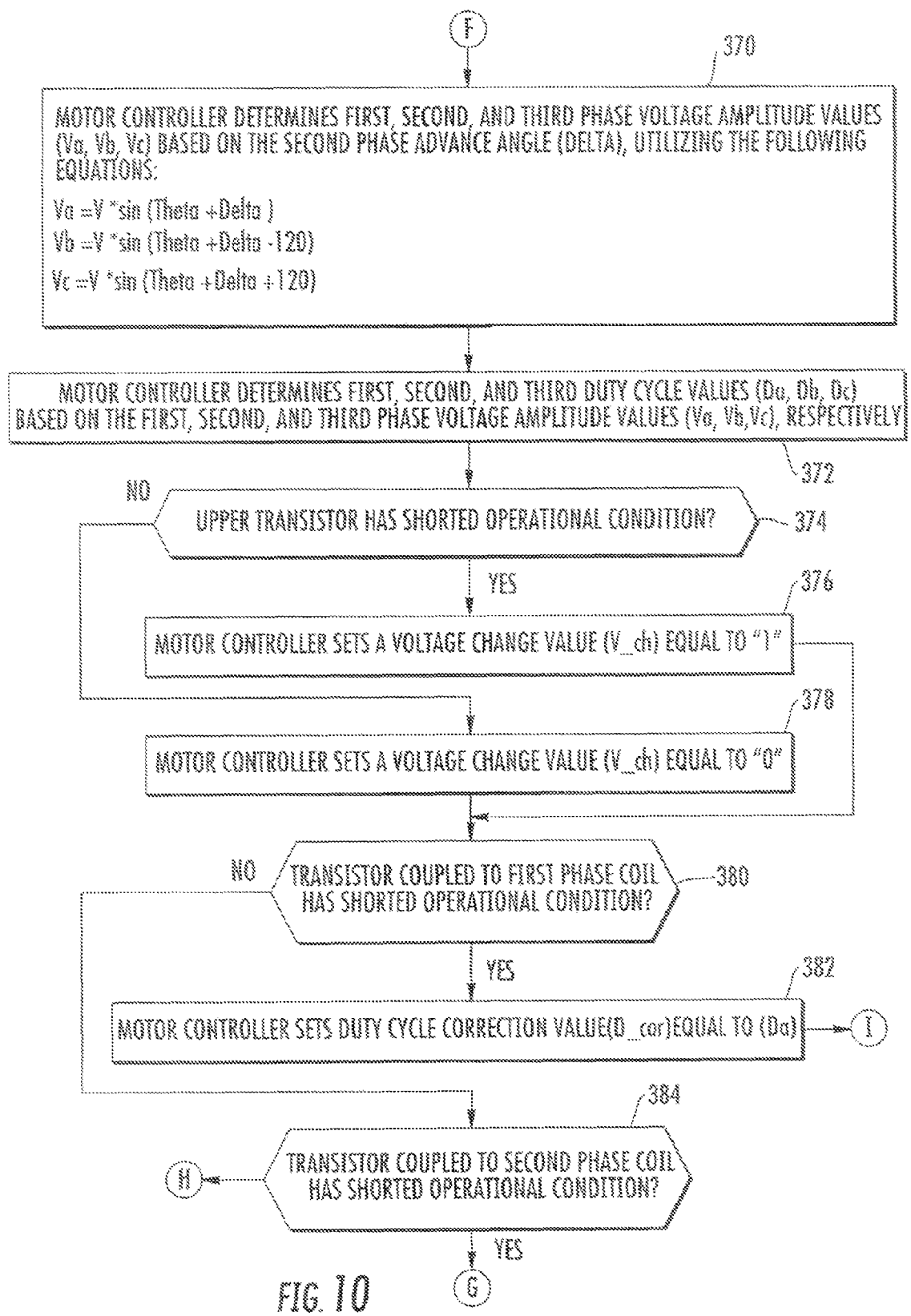
Figure 11:
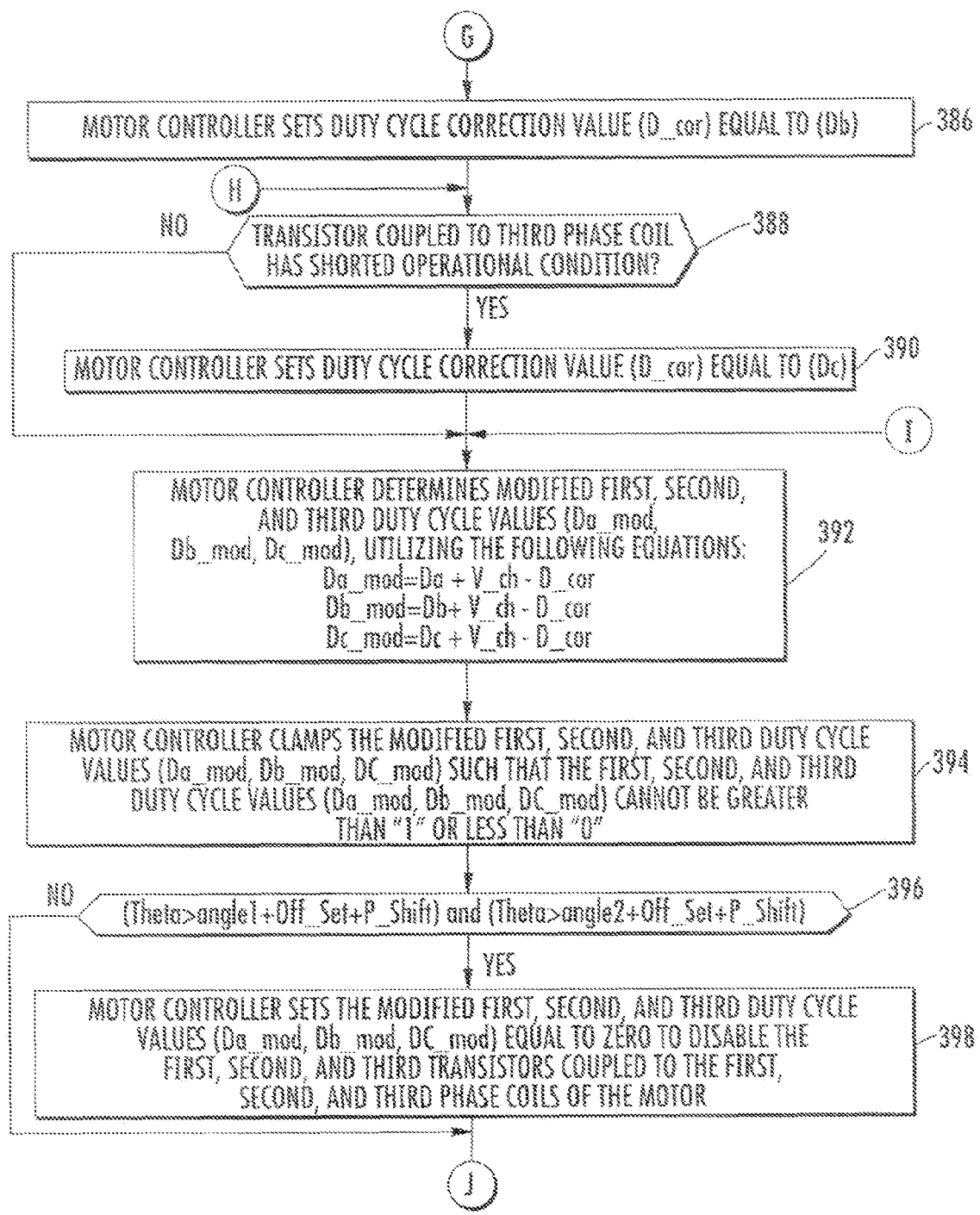
Figure 12:
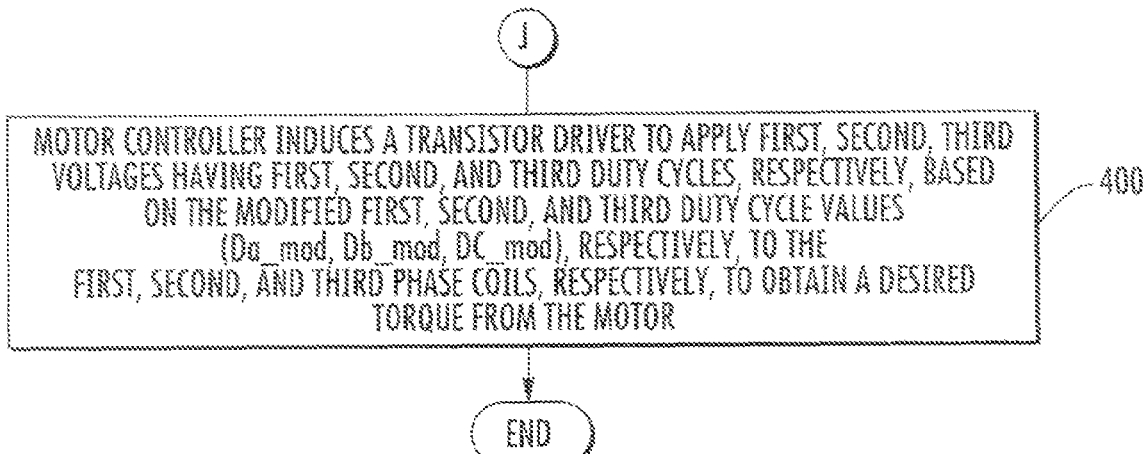

Referring to FIG. 6, an exemplary torque curve 300 illustrating a torque signal that is generated by the motor 82, during a shorted operational condition of the transistor 128. Referring to FIG. 7, duty cycle curves 310, 312, 314 indicate duty cycle values generated by the system 14 for controlling the motor 82 during a shorted operational condition of the transistor 128.

The system and the methods for controlling torque of the motor provide a substantial advantage over other systems and methods. In particular, the system and the methods provide a technical effect of determining when a shorted operational condition occurs at an input node of a phase coil and then controls a duty cycle of voltages applied to the phase coils to obtain a desired torque from the motor.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Further, the use of the terms a, an, etc. do not denote a limitation of quantity, but rather denote the presence of at least one of the referenced item.

What is claimed is:

1. A method for controlling torque of a motor, the motor having first, second, and third phase coils, the method comprising:

determining a motor position value indicative of a position of the motor;

determining a first phase advance angle associated with the first phase coil;

determining when a shorted operational condition occurs at an input node of the first phase coil;

when both the short operational condition is occurring and the motor position value indicates the motor is within a predetermined angular range, then determining a second phase advance angle associated with the first phase coil based on a calibration value;

determining first, second, and third phase voltage amplitude values based on the second phase advance angle;

determining first, second, and third duty cycle values based on the first, second, and third phase voltage amplitude values, respectively; and determining a modified first duty cycle value based on the first duty cycle value and a first predetermined value, the modified first duty cycle value indicative of a voltage that would be present at the input node of the first phase coil during the shorted operational condition;

determining a modified second duty cycle value based on the second duty cycle value and a second predetermined value; and determining a modified third duty cycle value based on the third duty cycle value and a third predetermined value; and applying first, second, and third voltages having first, second, and third duty cycles, respectively, based on the modified first, second, and third duty cycle values, respectively, to the first, second, and third phase coils, respectively, to obtain a desired torque from the motor.

2. A system for controlling torque of a motor, the motor having first, second, and third phase coils, the system comprising:

a controller configured to determine a motor position value indicative of a position of the motor, the controller further configured to determine a first phase advance angle associated with the first phase coil, the controller further configured to determine when a shorted operational condition occurs at an input node of the first phase coil, the controller further configured to determine a second phase advance angle associated with the first phase coil based on a calibration value when both the short operational condition is occurring and the motor position value indicates the motor is within a predetermined angular range, the controller further configured to determine first, second, and third phase voltage amplitude values based on the second phase advance angle, the controller further configured to determine first, second, and third duty cycle values based on the first, second, and third phase voltage amplitude values, respectively, the controller further configured to determine a modified first duty cycle value based on the first duty cycle value and a first predetermined value, the modified first duty cycle value indicative of a voltage that would be present at the input node of the first phase coil during the shorted operational condition, the controller further configured to determine a modified second duty cycle value based on the second duty cycle value and a second predetermined value, the controller further configured to determine a modified third duty cycle value based on the third duty cycle value and a third predetermined value; and a motor control circuit operably coupled to the first, second, and third phase coils of the motor and to the controller, the controller further configured to induce the motor control circuit to apply first, second, and third voltages having first, second, and third duty cycles, respectively, based on the modified first, second, and third duty cycle values, respectively, to the first, second, and third phase coils, respectively, to obtain a desired torque from the motor.

3. A method for controlling torque of a motor, the motor having first, second, and third phase coils, the method comprising:

determining first, second, and third duty cycle values associated with the first, second, and third phase coils, respectively;

determining when a shorted operational condition occurs at an input node of the first phase coil;

determining a modified first duty cycle value based on the first duty cycle value and a first predetermined value, the modified first duty cycle value indicative of a voltage that would be present at the input node of the first phase coil during the shorted operational condition;

determining a modified second duty cycle value based on the second duty cycle value and a second predetermined value; and determining a modified third duty cycle value based on the third duty cycle value and a third predetermined value; and applying first, second, and third voltages having first, second, and third duty cycles, respectively, based on the modified first, second, and third duty cycle values, respectively, to the first, second, and third phase coils, respectively, to obtain a desired torque from the motor.

4. The method of claim 3, wherein first, second, and third currents flowing through the first, second, and third phase coils, respectively, are substantially equal to currents that would be present in the first, second, and third phase coils, respectively, if the first phase coil did not have the shorted operational condition.

5. The method of claim 3, further comprising:

when both the short operational condition is occurring and the motor position value indicates the motor is within a predetermined angular range, then setting the modified first, second, and third duty cycle values equal to zero, such that the torque produced by the motor is reduced toward the desired torque level.

6. A system for controlling torque of a motor, the motor having first, second, and third phase coils, the system comprising:

a controller configured to determine first, second, and third duty cycle values associated with the first, second, and third phase coils, respectively, the controller further configured to determine when a shorted operational condition occurs at an input node of the first phase coil, the controller further configured to determine a modified first duty cycle value based on the first duty cycle value and a first predetermined value, the modified first duty cycle value indicative of a voltage that would be present at the input node of the first phase coil during the shorted operational condition, the controller further configured to determine a modified second duty cycle value based on the second duty cycle value and a second predetermined value, the controller further configured to determine a modified third duty cycle value based on the third duty cycle value and a third predetermined value; and a motor control circuit operably coupled to the first, second, and third phase coils of the motor and to the controller, the controller further configured to induce the motor control circuit to apply first, second, and third voltages having first, second, and third duty cycles, respectively, based on the modified first, second, and third duty cycle values, respectively, to the first, second, and third phase coils, respectively, to obtain a desired torque from the motor.

7. The system of claim 6, wherein first, second, and third currents flowing through the first, second, and third phase coils, respectively, are substantially equal to currents that would be present in the first, second, and third phase coils, respectively, if the first phase coil did not have the shorted operational condition.

8. The system of claim 6, wherein the controller is further configured to set the modified first, second, and third duty cycle values equal to zero, such that the torque produced by the motor is reduced toward the desired torque level when both the short operational condition is occurring and the motor position value indicates the motor is within a predetermined angular range.

* * * * *